March 17, 1970     H. D. SCHARF     3,501,075
WIRE TENSION CONTROL DEVICE
Filed Nov. 28, 1967     4 Sheets-Sheet 1
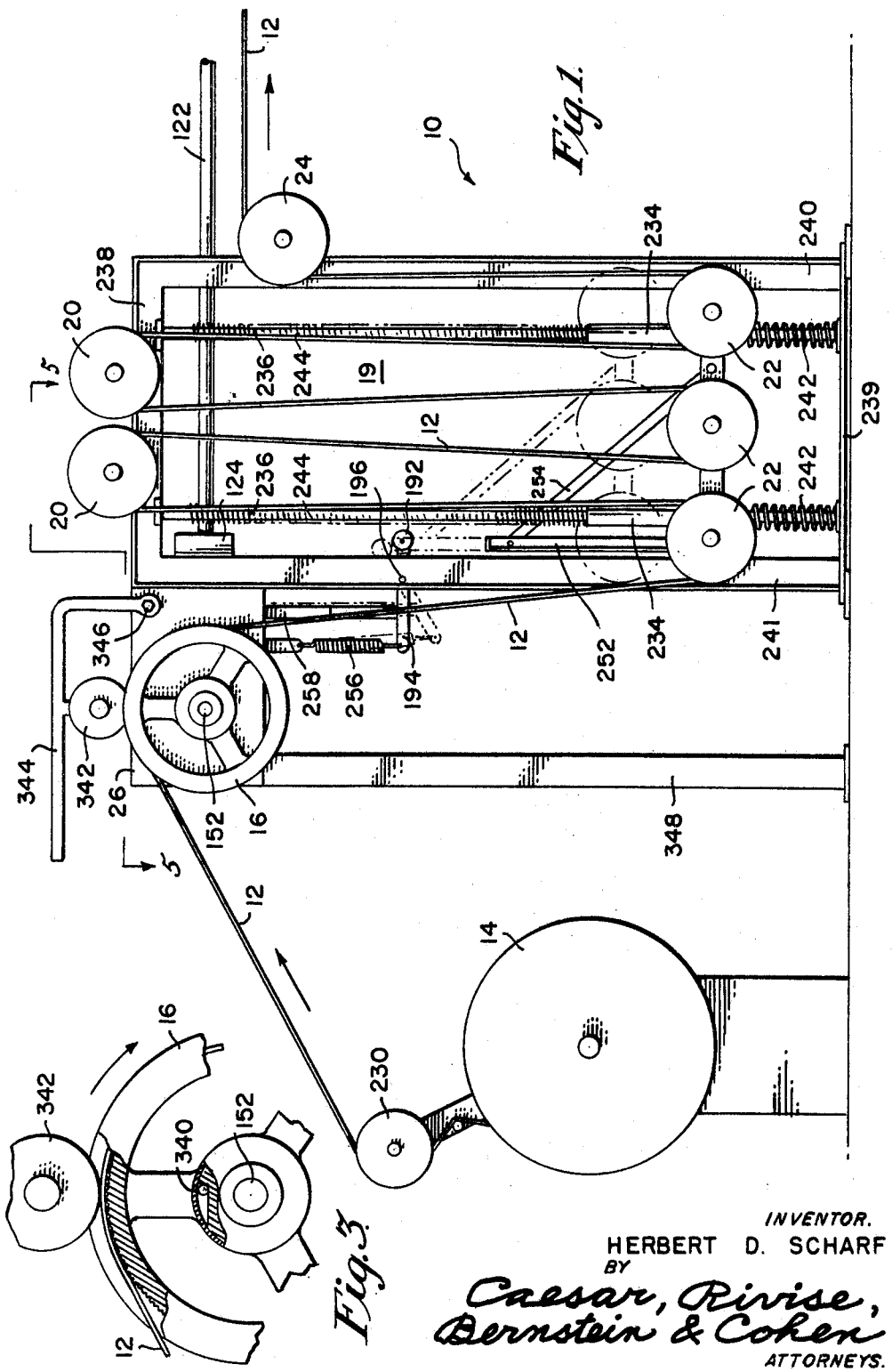
INVENTOR.
HERBERT D. SCHARF
BY
Caesar, Rivise,
Bernstein & Cohen
ATTORNEYS.

March 17, 1970 H. D. SCHARF 3,501,075
WIRE TENSION CONTROL DEVICE
Filed Nov. 28, 1967 4 Sheets-Sheet 2
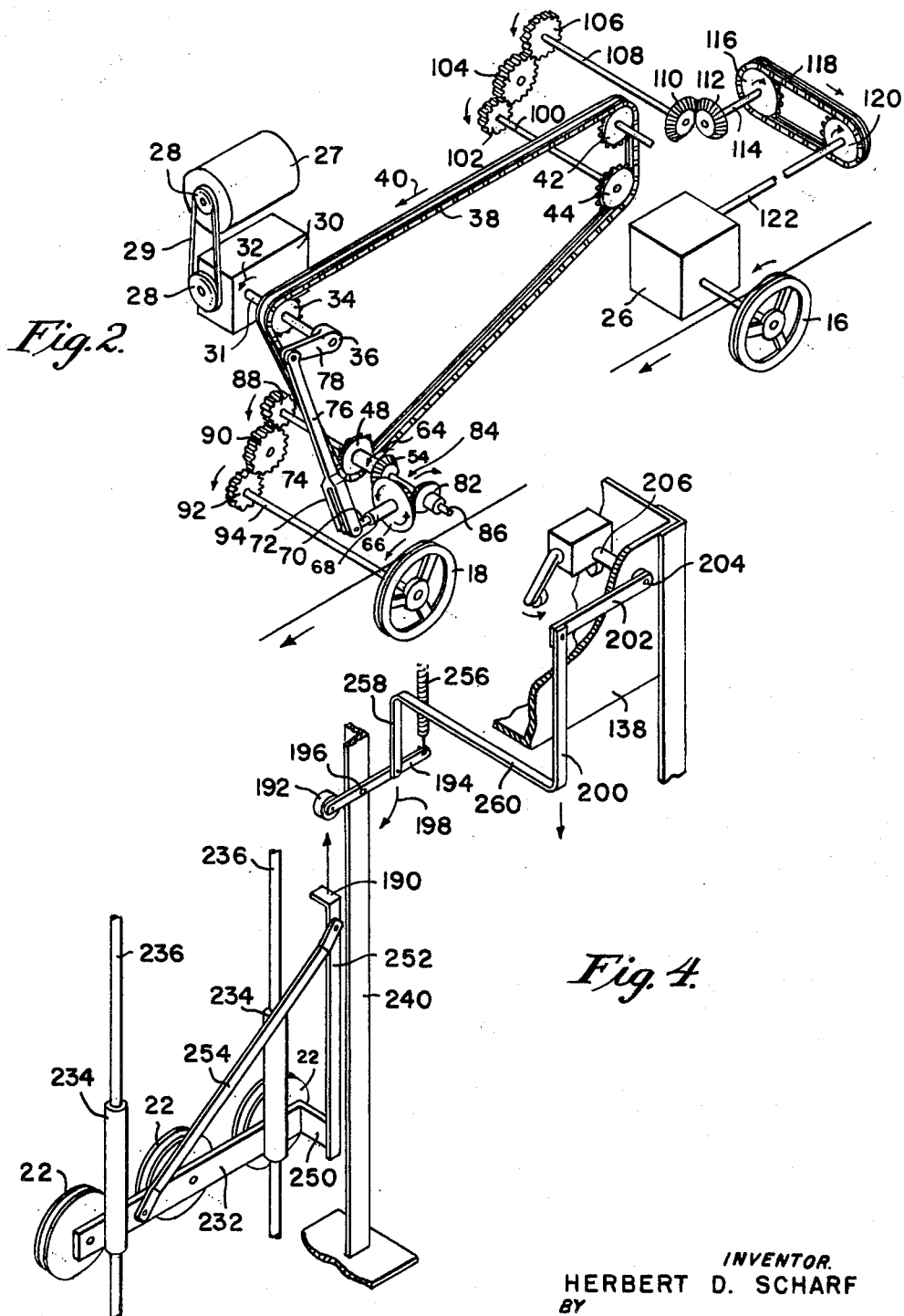
INVENTOR.
HERBERT D. SCHARF
BY
Caesar, Rivise,
Bernstein & Cohen
ATTORNEYS.

March 17, 1970 H. D. SCHARF 3,501,075
WIRE TENSION CONTROL DEVICE
Filed Nov. 28, 1967 4 Sheets-Sheet 3

INVENTOR.
HERBERT D. SCHARF
BY
Caesar, Rivise,
Bernstein & Cohen
ATTORNEYS.

March 17, 1970 H. D. SCHARF 3,501,075
WIRE TENSION CONTROL DEVICE
Filed Nov. 28, 1967 4 Sheets-Sheet 4
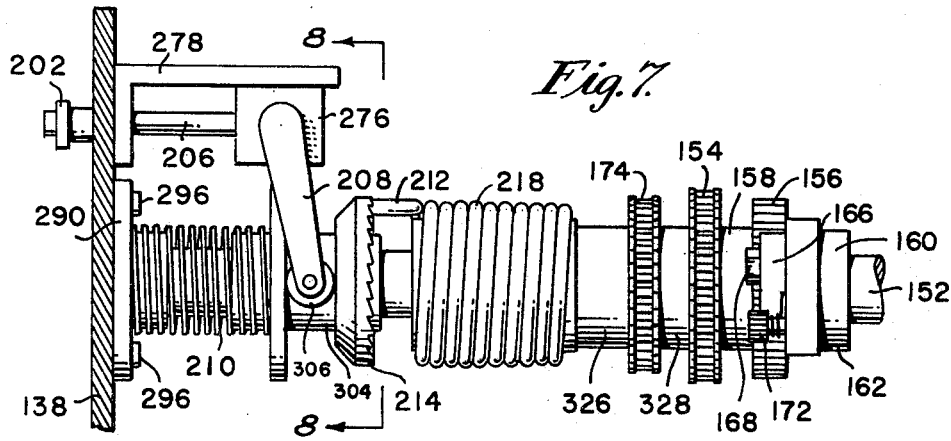
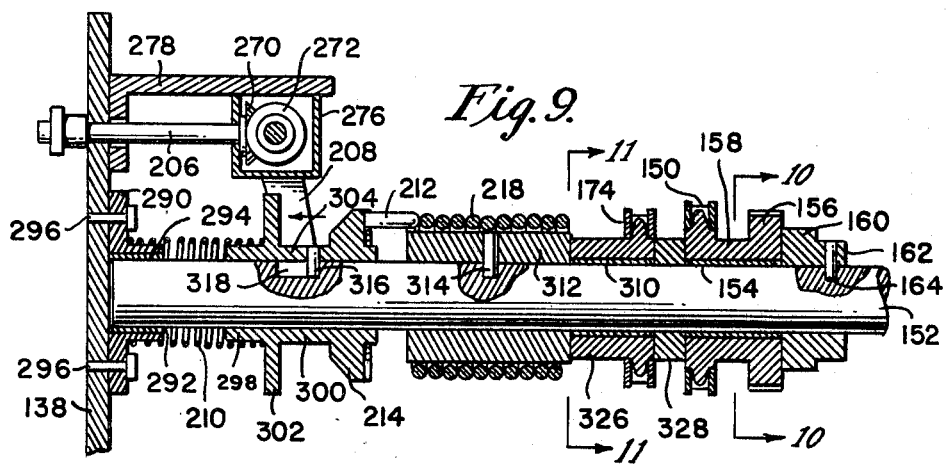
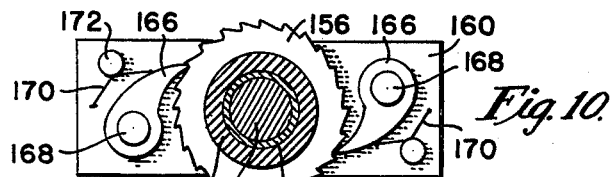
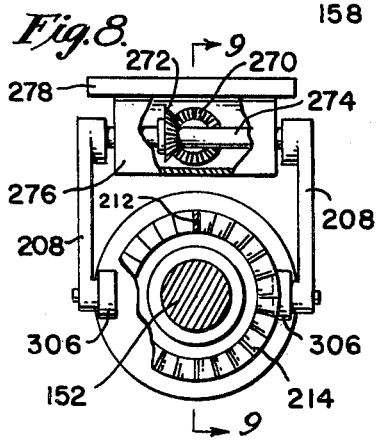
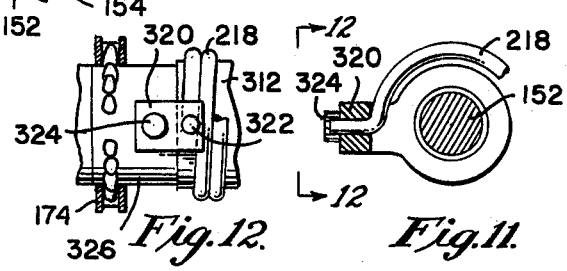
INVENTOR.
HERBERT D. SCHARF
BY
Caesar, Rivise,
Bernstein & Cohen
ATTORNEYS.

United States Patent Office 3,501,075
Patented Mar. 17, 1970

3,501,075
WIRE TENSION CONTROL DEVICE
Herbert D. Scharf, 437 Merwyn Road,
Merion, Pa. 19066
Filed Nov. 28, 1967, Ser. No. 686,239
Int. Cl. B65h 25/00
U.S. Cl. 226—25                                    3 Claims

ABSTRACT OF THE DISCLOSURE

A wire tension control device for maintaining the tension exerted upon electrically insulated wire within desired limits during its travel from a delivery wheel to a feed wheel of a terminal affixing machine. The wire tension control device operates upon the delivery wheel of the terminal affixing machine and includes regular drive means and fast drive means. Tension responsive means are provided to become operative when the speed of the delivery wheel is inadequate to prevent excessive tension from building up in the wire during its travel between the delivery wheel and feed wheel of the terminal affixing machine. When the upper limit of allowable tension is exceeded, tension responsive means actuate fast drive means which rotate the delivery wheel at a faster rate than the regular drive means and thereby cause the delivery wheel to deliver wire at a faster rate to the feed wheel, and in this way lessen the wire tension between the delivery wheel and the feed wheel. When the wire tension has fallen sufficiently into the allowable range, the tension responsive means disconnects the fast drive means so that the delivery wheel is again driven by regular drive means. The tension responsive means serves to operate a clutch face to establish or disestablish a driving connection between the fast drive means and the delivery wheel of the terminal affixing machine.

This invention relates to a wire tension control device for maintaining the tension exerted upon electrically insulated wire within desired limits during its travel from a delivery wheel to a feed wheel of a terminal affixing machine. A preferred embodiment of the wire tension control device of the present invention will be described herein with reference to the wire processing and terminal affixing machines described and claimed in Scharf Patent No. 3,267,556 issued Aug. 23, 1966. However, it is believed to be evident that the wire tension control device of the present invention is suitable for use with other terminal affixing machines or with other types of wire transport or processing machines, wherever it is desired to maintain the tension upon the wire within desired limits. Furthermore, the wire tension control device of the present invention will find use in apparatus for handling of uninsulated wire or other materials like rope or plastic.

The transporting of electrically insulated wire, hereinafter referred to as electrical wire, usually involves applying some degree of motive force to the wire so that the wire is caused to travel from an upstream point to a downstream point. Since the electrical wire will normally become slack when the motor force is removed, the application of a transporting force to the wire necessarily induces some tension in the wire. When the tension becomes excessive the electrical wire will be caused to stretch or lengthten, and this will alter the electrical and mechanical properties of the wire. A longer wire will offer more resistance to the passage of electrical current, and the smaller cross section afforded by a longer wire may not present sufficient strength and protection in the event of adverse conditions. Furthermore, where the tension varies over excessively wide limits, there will be a corresponding lack in uniformity of the product, and for this reason it is most desirable to hold the tension within satisfactory limits.

It is therefore an object of the present invention to present a wire control device which maintains the tension exerted upon electrical wire within desired limits.

Yet another object of the present invention is to provide a wire tension control device of a relatively simple construction and of reliable operation.

Still another object of the present invention is to provide a wire tension control device which will deliver wire to a feed wheel that operates at a variable speed with a predetermined reversal in direction.

The foregoing as well as other objects of the invention are achieved by providing a wire tension control device which operates upon the delivery wheel of a terminal affixing machine. The delivery wheel serves to draw wire from a supply wheel and then to propel the wire downstream toward a feed wheel. In the wire processing and terminal affixing machine of Patent No. 3,267,556 the electrical wire is fed downstream to the cutting and stripping head by the feed wheel, but the downstream motion of the feed wheel slows down and finally reverses for stripping purposes. Such a variable speed action tends to build up undesirable tension in the wire, particularly since it is the downstream located feed wheel which undergoes the aforesaid non-uniform speed with an actual reversal in direction for a short period of time.

When the upper limit of allowable tension in the wire between the upstream delivery wheel and downstream feed wheel is exceeded, tension responsive means in the present invention actuate fast drive means to rotate the delivery wheel at a faster rate of speed than it was being rotated by regular drive means. Thus, when the variable speed of the delivery wheel induces excessive tension in the wire the delivery wheel will be driven by the fast drive means in order to propel more wire toward the feed wheel, and in this way the tension is reduced. When the wire tension falls sufficiently into the allowable range the tension responsive means disconnects the fast drive means so that the delivery wheel is again driven by the regular drive means. The tension responsive means operates a clutch face which establishes or disestablishes a driving connection between the fast drive means and the delivery wheel of the terminal affixing machine.

Other objects and many of the attendant advantages will be readily appreciated as the same becomes better understood by reference to the following detailed description when considered in connection with the accompanying drawings wherein:

FIG. 1 is a front elevational view showing the supply wheel, the delivery wheel and tension responsive means of the present invention;

FIG. 2 is a perspective view showing the basic drive mechanism for the delivery wheel and the feed wheel;

FIG. 3 is an enlarged fragmentary elevational view with portions cut away of the delivery wheel which also illustrates its uni-directional rotation;

FIG. 4 is a fragmentary perspective view of the tension responsive means, taken generally from the rear thereof;

FIG. 7 is a view taken along the lines 7—7 of FIG. 6 showing other details of the fast drive means including the connection with the clutch face;

FIG. 8 is a view taken along the lines 8—8 of FIG. 7;

FIG. 9 is a sectional view taken along the lines 8—8 of FIG. 7;

FIG. 10 is a sectional view 10—10 of FIG. 9;

FIG. 11 is a sectional view taken along the lines 11—11 of FIG. 9;

FIG. 12 is a view taken along lines 12—12 of FIG. 11; and

Figure 5:
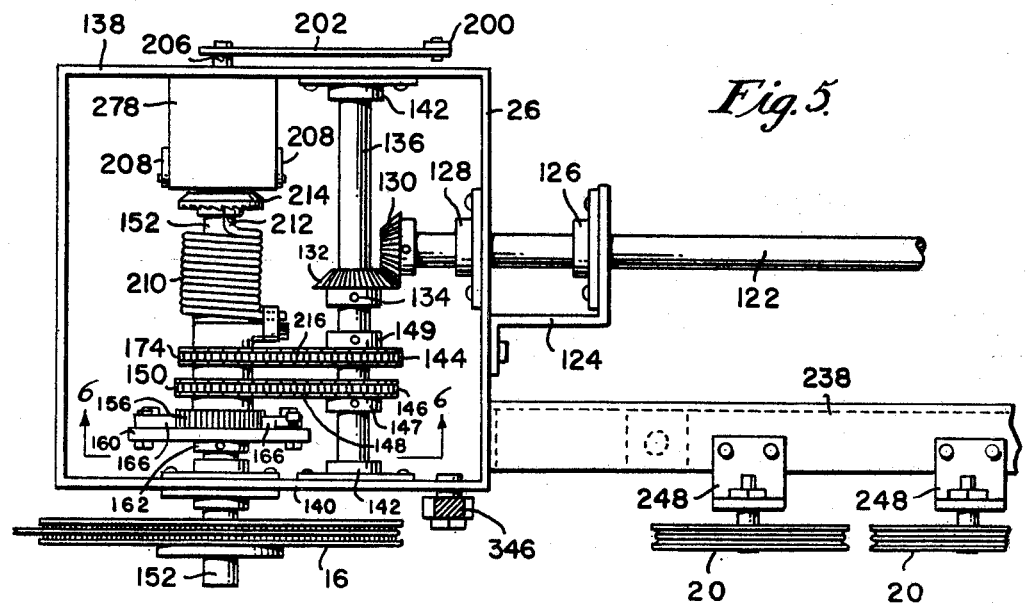
FIG. 5 is an enlarged view taken along the lines 5—5 of FIG. 1, showing certain features of the regular drive means and fast drive means.
Figure 6:
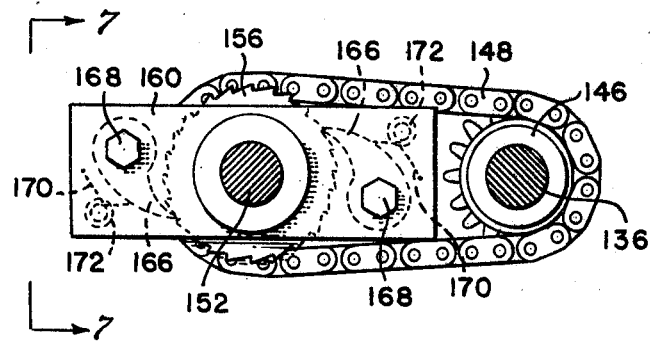
FIG. 6 is a sectional view taken along the lines 6—6 of FIG. 5.
Figures 13, 14:
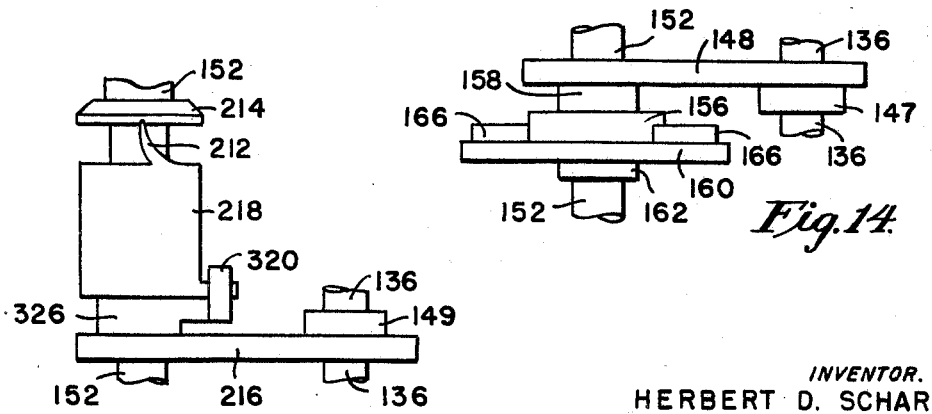
FIGS. 13 and 14 are schematic views showing the operation respectively of the fast drive means and regular drive means.

Before referring to the various figures of the drawing, the wire processing and terminal affixing machine of Scharf Patent No. 3,267,556 will be briefly described for reference purposes as operating in accordance with the following cycle:

(1) The feed wheel pushes wire to be processed through a guide tube which has already been elevated and extended.

(2) As wire is being pushed through the guide tube, the guide tube drops down at a predetermined time immediately behind the conveyor gripper which is at that time in open position.

(3) The guide tube retracts and the wire, which is still feeding, is laid into and passes through the conveyor gripper.

(4) The guide tube retracts back beyond the cutting and stripping zone and the feed wheel begins to slow down.

(5) The cutting and stripping knives start to close and the stripper gripper simultaneously begins to close about a downstream portion of the wire as the motion of the wire is substantially stationary.

(6) The cutting and stripping knives have fully closed, the downstream wire is fully gripped by the stripper gripper and the feed wheel has stopped.

(7) The feed wheel reverses to strip the downstream end of the upstream wire and simultaneously the stripper gripper advances to strip the upstream end of the downstream wire.

(8) Near the end of the advance of the stripper gripper it trips a spring loaded link which closes the conveyor gripper.

(9) As the conveyor gripper closes the stripper gripper opens and the following happens:

(a) The conveyor on which the conveyor gripper is located moves a fixed distance to carry the processed wire toward a terminal affixing station.

(b) The guide tube is now elevated and extended, the guide tube passing over the cutting and stripping knives before they open.

(c) The cutting and stripping knives then start to open.

(d) The feed wheel begins to feed wire forwardly through the guide tube.

(e) The opened stripper gripper begins to return to its initial rearward position.

In another embodiment of the invention of Patent No. 3,267,556 a feeder gripper is provided upstream of the cutting and stripping knives. With this embodiment of the invention a terminal will be secured to both stripped ends of the length of wire.

The wire is still being fed forwardly at a decelerating rate when the stripper gripper and feeder gripper simultaneously close upon it. With the wire still being fed slowly forwardly, the stripper gripper advances and the feeder gripper retracts simultaneously. In this way, the upstream end of the downstream wire and the downstream end of the upstream wire are simultaneously stripped.

The feeder gripper now pivots after completion of the linear stripper action in order to present the bared downstream end of the upstream wire to a terminal affixing station. The wire feed is now reversed and so any loop of wire built up after the closing of the feeder gripper tends to be minimized.

There was also described in Patent No. 3,267,556 the leading of insulated wire to the feed wheel from a tension pulley assembly. This assembly basically comprised two vertically spaced rows of pulleys with the wire being led alternately about a pulley of an upper row and then about a pulley of a lower row. The various upper and lower pulleys were tension mounted with respect to each other by virtue of spring arrangements so that the feed wheel could push the wire into the terminal affixing apparatus rather than pull it.

While the aforesaid pulley assembly has proven to be satisfactory in many instances, there are certain types of electrically insulated wire wherein excessive tension has an adverse effect. Such excessive tension would exist with a simple pulley assembly by virtue of the variable pushing action of the feed wheel as described hereinabove wherein the feed wheel not only slows down but even reverses for a short period of time.

Referring now in greater detail to the various figures of the drawings wherein similar reference characters refer to similar parts, a wire tension control device embodying the present invention is generally shown at 10 in FIG. 1 which also shows electrically insulated wire 12 being drawn from supply wheel 14 by delivery wheel 16. It is the delivery wheel 16 which is rotated by the regular drive means and fast drive means in accordance with the action of the tension responsive means.

Before describing the details of the regular drive means, fast drive means and tension responsive means, attention is called to FIG. 2 which shows the various power elements which drive delivery wheel 16 and feed wheel 18. FIG. 1 shows the pulley assembly 19 which includes upper pulleys 20, lower pulleys 22 and feed pulley 24, the pulley assembly 19 being interposed between upstream delivery wheel 16 and downstream feed wheel 18. However, the pulley assembly 19 is eliminated from FIG. 2 for the sake of clarity.

As will appear hereinafter the delivery wheel 16 is driven at regular and fast speeds by virtue of the mechanism within housing 26 with the feed wheel 18 delivering the electrically insulated wire to the terminal affixing machine. It is the feed wheel 18 which is driven at a variable forward speed with a momentary reverse in rotation. It is thus seen that as the feed wheel 18 moves through its variable speeds and its two direction rotational cycle, that the upstream delivery wheel 16 will be drawing electrical wire from supply wheel 14 and propelling it downstream through the pulley assembly 19 of FIG. 1 and then to feed wheel 18. The delivery wheel 16 will be rotated at regular speed until an excessive level of tension develops in pulley assembly 19 at which time the fast drive means will become effective to rotate the delivery wheel 16 at a greater speed. In this way the wire 12 will be fed at a faster rate to the pulley assembly 19 to lessen the tension in the wire as it is being fed forwardly under the varying speed and two directional operation of the feed wheel 18.

As further shown in FIG. 2 operative power for the delivery wheel 16 and feed wheel 18 as well as for other parts of the terminal affixing machine is provided by an electrical motor 27 which is connected by way of pulleys 28 and belt 29 to a gear reducer assembly in gear box 30. This in turn operates the drive shaft 31 at a constant speed in a given direction, such as in a counterclockwise sense as illustrated by the arrow 32.

Rotation of the main drive shaft 31 in turn directly causes rotation of a driving sprocket 34, and a trunnion crank arm 36 which is secured at the outer end of the main drive shaft 31.

A link chain 38 passes about the driving sprocket 34 and is accordingly driven thereby in the direction of arrow 40. The linear motion imparted to the link chain 38 is used to drive driven sprockets 42 (idler), 44 and 48 as illustrated in FIG. 2. The rotation of the sprocket 48 in turn causes a rotation of a first bevel gear 54 which is actually integral with the sprocket 48.

As previously noted, the first bevel gear 54 is integral with the driven sprocket 48 and thus rotates therewith in the counter-clockwise direction of arrow 64. This counter-clockwise rotation of the first bevel gear 54 in turn initiates a counter-clockwise rotation of the differential idler gear 66. A collar 68 is integral with the differential gear 66 and accordingly rotates therewith. A short shaft 70 passes through the collar 68 and is so secured within a complementary opening through gear 66 that it does not interfere with the rotation of the collar 68. The short shaft 70 is pinned to a yoke 72 which has arms 74 merging upwardly into a lever 76 which has an upper end pivotally secured to one end of a crank arm 78. As the main drive shaft 31 rotates in the counter-clockwise direction of arrow 32, the crank arm 78 in turn is rotated in a counter-clockwise direction. This in turn carries the upper end of lever 76 in a circular pattern about the axis of shaft 30. By virtue of the foregoing action the short shaft 70 and in turn the differential idler gear 66 is caused to rock or undergo an oscillating motion. This motion and the mechanism causing it are discussed and shown in considerable detail in Scharf Patent No. 2,756,619. In this connection, the combination of the differential gear 66 with the first bevel gear 54 (which drives the idler gear 66) and a second bevel gear 82 which in turn is driven by the bevel gear 66 with the various shafts and other mechanism, some of which have already been described, is to be hereinafter identified as the trunnion assembly 84.

The second bevel gear 82 is pinned to a gear shaft 86 which passes through the first bevel gear 54 without in any way interfering with it. The shaft 86 has secured thereto at the far end thereof a first feed wheel gear 88.

It is thus seen from the foregoing that rotation of the sprocket 48 initiates rotation of a first bevel gear 54. This in turn causes a rotation of gear 66 which in turn initiates a rotation of a second bevel gear 82. It is to be pointed out that the second bevel gear 82 will therefore almost always rotate in a sense opposite to that of the first bevel gear 54.

As the second bevel gear 82 is pinned to a gear shaft 86 which does not in any way affect the first bevel gear 54, the net result from the foregoing mechanism is that the shaft 86 is driven in a sense opposite to the sprocket 48 with the rotation of the shaft 86 capable of being altered, namely, slowed down and eventually even reversed for a short time, by virtue of the oscillating motion imparted to the differential idler gear 66 by virtue of the action of the crank arm 78.

It is the reversal of the rotation of the gear shaft 86 which in turn causes a reversal of the rotation of the feed wheel 18 for purposes of stripping the downstream end of the upstream wire.

When the trunnion assembly 84 moves in the same sense as the sprocket 48, there is less relative movement between the gears 54 and 66 than when the gear 66 is stationary, and hence the radian motion of the trunnion is subtracted from the motion of the sprocket. Thus, when the radian motion of the trunnion assembly 84 during a portion of its oscillation cycle is equal in both magnitude and sense to the radian motion of the sprocket 48 per unit of time, the resultant radian motion of the shaft 86 will be substantially zero. This is because there is no relative motion between the gears 54 and 66 and hence the gear 54 cannot drive the gear 66. As the radian motion of the trunnion assembly 84 exceeds the radian motion of the sprocket 48, the shaft 86 actually reverses its rotation.

Alternately, when the trunnion assembly moves in a direction opposite to that of the sprocket 48, the motion of the trunnion assembly is added to that of sprocket 48 and thus the rotation of the shaft 86 is thereby accelerated during that particular portion of the cycle of the trunnion assembly 84.

As further illustrated in FIG. 2, the shaft 86 has pinned at the far end thereof a first feed wheel gear 88. The gear 88 meshes with a second feed wheel gear 90 which in turn meshes with a third feed wheel gear 92. A feed wheel shaft 94 is secured to the gear 92 with the feed wheel 18 being secured to the other end of the feed wheel shaft 94. Thus, rotation of the shaft 86 is in turn transmitted by a feed wheel shaft 94 to the feed wheel 12. Hence, a reversal of the shaft 86, in turn causes a reversal of the rotation of the feed wheel 18.

The driving of chain 38 in the direction of arrow 40 of FIG. 2 also causes sprocket 44 to rotate in a counter-clockwise sense. A shaft 100 connects sprocket 44 to gear 102 which meshes with second gear 104 that in turn meshes with third gear 106. It can be seen from FIG. 2 that counter-clockwise rotation of sprocket 44 in turn causes counter-clockwise rotation of gears 102 and 106 in the direction of the indicated arrows. A shaft 108 extends from third gear 106 with a first bevel gear 110 being attached to the opposite end of shaft 108. The first bevel gear 110 meshes with second gear 112 which is in turn connected by shaft 114 to sprocket 116. It is therefore seen that the counter-clockwise rotation of third gear 106 causes a counter-clockwise rotation of bevel gear 110. As further seen in FIG. 2 a link chain 118 connects sprocket 116 to sprocket 120 with the clockwise rotation of sprocket 116 causing a clockwise rotation of sprocket 120 from which driving rod 122 extends to housing 26. It is the drive rod 122 as best shown in FIG. 5 which operates the regular drive means and fast drive means as will appear hereinafter.

Reference is now made to the regular drive means for delivery wheel 16 as will appear from a consideration of FIGS. 5, 6, 7, 9 and 10. As shown in FIG. 5, the drive rod 122 passes into housing 26 through support member 124 and associated bearings 126 and 128. A bevel gear 130 is secured at the end of driving rod 122 with the bevel gear 130 meshing with a bevel gear 132 that is pinned at 134 to a shaft 136 that extends from the rear wall 138 to forward wall 140 of the housing 26. Suitable bearings 142 are provided.

Also pinned to the shaft 136 is a rear sprocket 144 and a front sprocket 146. A chain 148 extends from front sprocket 146 across to front sprocket 150 (FIG. 9) that is freely rotatable on shaft 152 to which delivery wheel 18 is rotatably attached. As shown in FIG. 9 the sprocket 150 is secured to a bushing 154 (FIG. 9) through which the shaft 152 passes without connection. Thus, rotation of driving rod 122 will cause shaft 136 to rotate by means of bevel gears 130 and 132. Rotation of shaft 136 is carried over to front sprocket 150 by means of front sprocket 146 and chain 148. But shaft 152 is not rotated by sprocket 150 since, as shown in FIG. 9, the sprocket 150 is attached to bushing 154 through which shaft 152 freely passes.

However, as further shown in FIG. 9 the front sprocket 150 has an integrally attached ratchet wheel 156 through common bridging section 158. It is noted that bushing 154 is telescoped within both front sprocket 150 and ratchet wheel 156. Positioned immediately in front of ratchet wheel 156 is a pawl arm 160 which includes an integral forward collar 162 that is pinned to shaft 152, by pin 164. As shown in FIG. 10 the pawl arm 160 is generally rectangular and has a pair of pawls 166 pivotally secured thereto at 168. The pawls 166 are biased by springs 170 into engagement with ratchet wheel 156. The pawl arm 160 is also somewhat visible in a rearwardly looking view of FIG. 6. Since the sprocket 150 and therefore the ratchet wheel 156 is rotated in a counter-clockwise direction as viewed in FIGS. 5 and 6 it can be seen from FIG. 6 that the ratchet teeth are engaged by pawls 166. In this way rotational movement is conveyed from front sprocket 150 to ratchet wheel 156 and then to pawl arm 160. Since the pawl arm 160 is pinned to shaft 152, it follows that shaft 152, and therefore delivery wheel 16 that is secured to shaft 152 will be rotated by ratchet wheel 156.

It is to be noted that front sprocket 146 that is secured to shaft 136 has fewer teeth than front sprocket 150 that is secured to shaft 152. In an embodiment of the invention the front sprocket 146 had 16 teeth and the front sprocket 150 had 17 teeth. It will be seen that this makes for a slight slowing in the rate of rotation of front sprocket 150 which is otherwise of the same diameter as the front sprocket 156.

It will be later seen that rear sprocket 144 attached to shaft 136 will have more teeth than corresponding rear sprocket 174 attached to shaft 152 in order to effect an increase in the speed of rotation of the sprocket 174. The aforesaid relationship of the sprockets 144 and 174 is a part of the fast drive means that will cause the shaft 152 to be rotated at a rate faster than it is rotated when the driving force comes solely from the regular drive means including sprockets 146 and 150.

In view of the foregoing it can be seen that the regular drive means comprises a connection from driving rod 122 through gears 130 and 132 to shaft 136 and then through front sprockets 146 and 150 by way of a chain 148, with the drive connection from sprocket 150 being achieved through integrally attached ratchet wheel 156 with both sprocket 150 and ratchet wheel 156 being unconnected to or freely rotatable on shaft 152. The actual drive connection between ratchet wheel 156 and shaft 152 is achieved through pawls 166 in an engagement with the teeth of the ratchet wheel 156, with the pawls 166 being attached to the pawl arm 160 that has a hub 162 which is pinned to shaft 152 to which the delivery wheel 16 is attached.

So long as the tension in the wire 12 extending between pulleys 20 and 22 does not exceed the allowable level, the regular drive means (the driven ratchet wheel 156 causing shaft 152 to rotate through pawl arm 160) continues to rotate delivery wheel 16. However, the pulleys 20 and 22 in effect constitute tension responsive means as will now be described. In particular, the lower pulleys 22 are freely moveable in a vertical direction with the upper pulleys 20 being fixed. Thus, as tension increases in the electrically insulated wire 12 the lower pulleys 22 will rise as indicated in phantom in FIG. 1.

As the lower pulleys rise, a tab 190 (FIG. 4) also rises, and eventually will contact a roller 192 to force arm 194 to pivot in a counter-clockwise sense about point 196 in the direction of arrow 198 of FIG. 4. This has the effect of pulling arm 200 downwardly and rotating pivotally attached arm 202 in a counter-clockwise sense about pivot point 204. By virtue of a bevel gear connection, the counter-clockwise rotation imparted to shaft 206 by arm 202 urges arms 208 forwardly in the direction of expansion of spring 210 to allow spring point 212 to engage a groove in forwardly urged clutch face 214.

As will be described in greater detail hereinafter, the engagement of spring point 212 and clutch face 214 completes a driving connection for rear chain 216 (FIG. 5) between rear sprockets 144 and 174. Thus, the rear sprocket 174 is now also driven by the rotation of shaft 136.

Since there is a direct connection between rear sprocket 174 and connecting drive spring 218 (as shown in FIG. 12) the rotation of sprocket 174 is carried to clutch face 214, which as shown in FIG. 9 is pinned to shaft 152. Hence shaft 152 is now driven by rear sprocket 174 at the same time it is being driven by forward sprocket 150.

However, the rear sprocket 174 has at least one tooth less than the rear sprocket 144 with the sprockets being otherwise of equal diameter. Thus the chain 216 will drive rear sprocket 174 at a speed greater than the chain 148 drives forward sprocket 150.

In view of the foregoing the shaft 152 is driven at the faster speed of the rear sprocket 174, with the forward sprocket 150 still driving shaft 152 through ratchet wheel 156 at a somewhat slower speed. In view of this, it can be observed that when rear sprocket 174 is driving the shaft 152 with its attached pawl arm 160, that the pawl arm 160 will be seen to be driven faster by rear sprocket 174 than the ratchet wheel 156 is driven by forward sprocket 150.

Thus, pawls 166 will be seen to actually glide over the teeth of the ratchet wheel 156.

In the light of the foregoing it follows that the tension responsive means comprises the lower, vertically moveable pulleys 22 which rise in response to increased wire tension with the tab 190 also rising to actuate a mechanical linkage system that allows ratchet face 214 to engage spring pin 212, and thereby complete the driving connection for the fast drive means.

The delivery wheel 16 will now be driven at a faster rate by rear sprocket 174. It therefore can be seen that the fast drive means is comprised of the rear sprocket 174 which can be engaged to drive shaft 152 directly.

The details of the tension responsive means and fast drive means will now be described:

With reference to FIG. 1 it can be seen that the electrical wire 12 is drawn from supply wheel 14 by the action of delivery wheel 16. The wire 12 is threaded about a portion of idler wheel 230 before reaching the delivery wheel. The wire then passes down to first vertically moveable lower pulley 22. As shown in FIGS. 1 and 4 each of the pulleys 22 are mounted on a bar 232 which is secured to a pair of tubes 234 through which pass rods 236. As indicated in FIG. 1 the ends of the rods 236 are secured in upper and lower frames 238 and 239 with connecting side posts 240 and 241. The rods 236 are telescoped within springs 242 and 244 that lend a resiliency to the movement of the tubes 234.

As further shown in FIG. 1 the upper pulleys 20 are revolvably secured upon the top frame 238 in brackets 239.

With reference to FIG. 4 the pulley arm 232 is secured to a short leg 250 from which bar 25 extends with tab 190 being formed at the upper end of the bar 252. A brace 254 also connects pulley arm 232 to the bar 252. As previously discussed there is an arm 194 that is pivotally connected at 196 to post 240. The roller 192 is secured to one end of the arm 193, and a biasing spring 250 is secured to the other end of the arm 194. Also secured to the arm 194 is a short run 258 that merges into a rearwardly extending bar 260 as connected to vertical arm 200. As further shown in FIG. 4 a horizontal arm 202 extends from vertical arm 200 with control shaft 206 being connected to arm 202 at point 204. It is thus seen that with the increase in wire tension the rise of pulley arm 232 eventually causes a counter-clockwise pivoting of arm 194 as shown in FIG. 4 that in turn causes a counter-clockwise pivoting of control shaft 206.

As shown in FIG. 8 a bevel gear 270 is secured to the forward end of the shaft 206, and there is a meshing bevel gear 272 secured to cross shaft 274 with a housing 276 being supported from ledge 278 which extends from rear wall 138. It can therefore be seen that the pivoting of shaft 206 which is initiated by tab 190 striking roller 192, causes pivoting of shaft 274 by virtue of meshing bevel gear 270 and 272.

As further shown in FIG. 8 arms 208 extend forwardly (FIG. 7) from shaft 274, such that the pivoting of shaft 274 causes a forward pivoting of arms 208 away from spring 210.

It is to be noted as can best be seen in FIG. 9 that a collar 290 having a hub 292 with inserted bearing 294 is secured against rear wall 138 by means of bolts 236. One end of the spring 210 is slipped over the hub 292. The forward end of the spring 210 is slipped over the rear ledge 298 of slidable member 300, the forward portion of which is the ratchet face 214. Extending from slidable member 300 is a circular flange 302 which limits the forward end of the spring 210.

A space exists between the rear ratchet face 214 and flange 302 which receives rollers 306 that are secured to arms 208. It can be seen that when the arms 208 are moved forwardly by virtue of the tension responsive means that cause pivoting of shaft 206, that the pressure of spring 210 urges slidable member 300 forwardly. The aforesaid forward movement halts when spring point 212 engages ratchet face 214. It can be seen that when the wire tension has decreased so that roller 192 (FIG. 4) is able to pivot downwardly with the dropping of tab 190, that the rollers 306 will pivot rearwardly against flange 302 and against the pressure of spring 210 to retract the ratchet face 214 away from spring point 212.

It is to be noted from FIG. 9 that rear sprocket 174 is supported upon a bushing 310 with driving spring 218 being wound on sleeve 312 that is secured by pin 314 to shaft 152. The slidable member 300 is also secured to shaft 152 by pin 316 that rides in slot 318 as the slidable member 300 moves back and forth.

As shown in FIGS. 11 and 12 the rear sprocket 174 is directly connected to spring 218 by means of a connector tab 320 which secures forward end 322 of spring 218 to post 324 that extends from rear sprocket collar 326. As indicated in FIG. 9 a spacer 328 is provided to separate bridging section 158 from rear sprocket 174. It should be noted that sleeve 312 as well as ratchet 214 are both keyed to shaft 152 since this allows the winding action of rear sprocket 174 upon drive spring 218 to be conveyed through ratchet face 214 to the shaft 152.

Because the feed wheel 18 is subject to a temporary reversal action for stripping purposes, it is necessary to prevent delivery wheel 16 from rotating rearwardly and this is accomplished as shown in FIG. 3 by means of anti-reverse roller 340, although such action can be achieved by a pawl and ratchet assembly or in other manners well known to the art. As further shown in FIGS. 1 and 3 a holddown roller 342 extends from arm 344 that is pivotally secured at 346 to front wall 140 of housing 26 may also be utilized, with the housing 26 being supported by post 348.

It is therefore seen from the foregoing description that the wire tension control device of the present invention maintains the tension exerted upon the wire within desired levels during the travel of the wire from the delivery wheel to the feed wheel. The tension control device of the present invention includes regular drive means for the delivery wheel and fast drive means for the delivery wheel with the wire passing through tension responsive means. The regular drive means drives the delivery wheel at a first speed to deliver wire to the feed wheel. When a pre-determined level of tension in the wire between the delivery wheel and the feed wheel is exceeded, the tension responsive means become operative to connect the fast drive means. When this occurs the fast drive means drive the delivery wheel at a speed faster than the first speed to deliver wire at a faster rate toward the feed wheel. This will bring about a decrease in the wire tension.

When the wire tension has decreased below a pre-determined level the tension responsive means will disconnect the fast drive means so that the regular drive means drives the delivery wheel at the first speed. This condition will persist until the maximum pre-determined level of tension in the wire is exceeded.

It will be appreciated that the pre-determined maximum level of tension that causes the fast drive means to be conencetd as well as the pre-determined lower level of tension that causes the fast drive means to be disconnected may be adjusted by varying the physical location of arm 194 or the tension in spring 256.

Furthermore, while a specific embodiment of the invention has been described wherein the regular drive means continuously operates to drive the delivery wheel, even when the fast drive means are actuated, it is recognized that the present invention may be practiced wherein the regular drive means are disconnected whenever the fast drive means become operative and vice versa.

In operation the rotation of driving rod 122 is conveyed through gears 130 and 132 to shaft 136 which, as shown in FIG. 5, drives rear sprocket 144 and front sprocket 146. The chain 216 connects rear sprocket 144 to rear sprocket 174, and the chain 148 connects front sprocket 146 to front sprocket 150. In the preferred embodiment of the invention the rear sprocket 144 has 17 teeth while rear sprocket 174 of equal diameter has 16 teeth. Front sprocket 146 has 16 teeth and front sprocket 150 of equal diameter has 17 teeth. Thus, with the front sprockets 146 and 150 there is a slight slowing down of speed in passing from front sprocket 146 to front sprocket 150. So long as ratchet or clutch face 214 is disengaged away from spring point 212, the rotation of shaft 136 will be conveyed from front sprocket 146 to front sprocket 150 in a slight slowing action through chain 148. As shown in FIG. 9 the sprocket 150 is freely rotatable on shaft 152, and therefore cannot directly drive the shaft 152. However, ratchet wheel 156 is integrally attached to front sprocket 150, and therefore rotates with front sprocket 150. The actual connection between ratchet wheel 156 and shaft 152 is achieved through pawls 156 in engagement with the teeth of ratchet wheel 156 with the pawls 166 being attached to the pawl arm 160 that has a hub 162 which is pinned to shaft 152 to which the delivery wheel 160 is attached.

So long as the tension in the wire 12 extending between pulleys 20 and 22 does not exceed the allowable level, the regular drive means (the driven ratchet wheel 156 causing shaft 152 to rotate through pawl arm 160) continues to rotate delivery wheel 16. However, the pulleys 20 and 22 in effect constitute tension responsive means as will now be described. In particular, the lower pulleys 22 are freely moveable in a vertical direction with the upper pulleys 20 being fixed. Thus, as tension increases in the electrically insulated wire 12 the lower pulleys 22 will rise as indicated in phantom in FIG. 1. The significance of pulley assembly 19 which includes upper pulleys 20 and lower pulleys 22 is therefore understood.

When the increased tension causes a lower pulley to rise a sufficient amount, the tab 190 will contact roller 192 to force arm 194 to pivot in a counter-clockwise sense about point 196 in the direction of arrow 198 of FIG. 4. This has the effect of pulling arm 200 downwardly and rotating pivotally attached arm 202 in a counter-clockwise sense about pivot point 204. By virtue of a bevel gear connection, the counter-clockwise rotation imparted to shaft 206 by arm 202 urges arms 208 forwardly in the direction of expansion of spring 210 to allow spring point 212 to engage a groove in forwardly urged clutch face 214.

With the engagement of spring point 212 in clutch face 214, the driving connection for rear sprocket 216 between rear sprockets 144 and 174 is completed. Thus the rotation of shaft 136 now drives clutch face 214 through sprocket 174. In this way the shaft 152 is directly driven by sprocket 174. Since the rear sprocket 174 has one less tooth than the sprocket 144, a faster drive is applied to shaft 152 by rear sprocket 174 than is applied by front sprocket 150 acting through pawl arm 160. With faster rotation of shaft 152, there will be a corresponding faster rotation of delivery wheel 16. Hence, wire will be drawn more quickly from supply wheel 14, and there will be a corresponding quickening in the amount of wire sent by the delivery wheel 16 through pulley assembly 19. This will cause a decrease in tension. As the tension lessens the tab 190 will drop down, and will reach a level that causes arms 208 to pivot rearwardly, and thereby withdraw clutch face 214 away from spring point 212.

At this time the fast drive means will be disconnected so that the shaft 152 is again rotated by the regular drive means.

In view of the foregoing it can be seen that the shaft 136 may be identified as a first shaft with the shaft 152 being known as a second shaft. The sprocket 146 will therefore be known as the first front sprocket and the sprocket 150 will be known as the second front sprocket. In a similar way the rear sprocket 144 will be known as the first rear sprocket and the rear sprocket 174 will be known as the second rear sprocket.

While the front sprocket 146 has been described as having fewer teeth than front sprocket 150 with the rear sprocket 174 having fewer teeth than rear sprocket 144, it is to be understood that the precise number of teeth in any particular sprocket or the relative sizes of the sprockets may vary as will be apparent to those skilled in the art. It will be appreciated that second front sprocket 150 is constructed to rotate slower than first front sprocket 146 with second rear sprocket 174 being constructed to rotate faster than first rear sprocket 144 so that second rear sprocket 174 rotates faster than second front sprocket 150. The terms "front" and "rear" as well as "first" and "second" are obviously relative ones, and the specification and claims are to be so understood.

Without further elaboration, the foregoing will so fully illustrate my invention, that others may, by applying current or future knowledge, readily adapt the same for use under various conditions of service.

What is claimed as the invention is:

1. A wire tension control device for maintaining the tension exerted upon wire within desired levels during its travel from a delivery wheel to a feed wheel, said tension control device including regular drive means for said delivery wheel and fast drive means for said delivery wheel, said wire passing through tension responsive means, said regular drive means driving said delivery wheel at a first speed to deliver wire to said feed wheel, said tension responsive means becoming operative when a pre-determined level of tension in said wire between said delivery wheel and said feed wheel is exceeded, to connect said fast drive means to drive said delivery wheel at a speed faster than said first speed to deliver wire at a faster rate toward said feed wheel to bring about a decrease in wire tension, whereby when the wire tension has decreased below a pre-determined allowable level, said tension responsive means will disconnect said fast drive means so that said regular drive means drives said delivery wheel at said first speed, and continues to do so until the pre-determined maximum level of tension in said wire is exceeded, said device further including a power source operating drive rod means which rotate a first shaft to which is attached separate sprocket means as separate parts of said regular drive means and said fast drive means, a first shaft and a second shaft, said first shaft being driven by said drive rod means, said delivery wheel being rotated by said second shaft, a first front sprocket on said first shaft and a second front sprocket on said second shaft, a chain connecting said sprockets, said regular drive means including said first front sprocket being secured to said first shaft for rotation therewith, but said second front sprocket being freely rotatable on said second shaft, a ratchet wheel with ratchet teeth integrally attached to said second front sprocket, and also being freely rotatable on said second shaft, a pawl arm pinned to said second shaft and having at least one pawl in driving engagement with a tooth of said ratchet wheel, said second front sprocket being constructed to rotate slower than said first front sprocket whereby rotation of said first front sprocket is conveyed through said second front sprocket to said second shaft through said pawl in driving engagement with a tooth of said ratchet wheel so that said first shaft drives said second shaft and also drives said delivery wheel at a regular rate of speed.

2. The invention of claim 1 including a first rear sprocket on said first shaft and a second rear sprocket on said second shaft, a chain connecting said sprockets, said second rear sprocket being constructed to rotate faster than said first rear sprocket, said fast drive means including spring point means rotatable with said second rear sprocket, and clutch face means separable from said spring point means, said clutch face means being secured for rotation to said second shaft, said tension responsive means becoming operative when a pre-determined level of wire tension is exceeded to urge said clutch face means relative to said spring point means so that said spring point means drivingly engages said clutch face means, whereby the faster rotation of said second rear sprocket is conveyed through said spring point means and clutch face means to said second shaft to rotate said second shaft under fast drive means at a speed faster than was attained by said regular drive means to thereby rotate said delivery wheel at a speed faster than said first speed, said tension responsive means disconnecting said clutch face means from said spring point means when the wire tension has decreased below a pre-determined allowable level so that the faster rotation of said rear sprocket is no longer conveyed to said second shaft whereby said first shaft drives said second shaft and said delivery wheel at a regular rate of speed.

3. The invention of claim 2 wherein said tension responsive means includes a pulley assembly about which said wire passes to cause movement of said pulley assembly to actuate tab means in response to an increase and decrease in the level of tension of said wire passing through said pulley assembly, said tab means actuating a mechanical linkage at a pre-determined level of tension to permit said clutch face means to engage said spring point and disengaging said clutch face means when the wire tension has decreased below a pre-determined allowable level.

References Cited
UNITED STATES PATENTS

| 2,491,228 | 12/1949 | Swift | 226—36 |
| 2,707,254 | 4/1955 | Newman | 226—30 X |
| 3,087,663 | 4/1963 | Anderson | 226—44 |

RICHARD A. SCHACHER, Primary Examiner

U.S. Cl. X.R.
226—40, 44